United States Patent
Kircher et al.

(10) Patent No.: US 9,868,531 B2
(45) Date of Patent: Jan. 16, 2018

(54) PASSENGER SEAT ARRANGEMENT FOR A VEHICLE

(71) Applicant: Airbus Operations GmbH, Hamburg (DE)

(72) Inventors: Benedikt Kircher, Hamburg (DE); Paul Edwards, Hamburg (DE); Stephan Sontag, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 228 days.

(21) Appl. No.: 14/669,252

(22) Filed: Mar. 26, 2015

(65) Prior Publication Data

US 2015/0274298 A1    Oct. 1, 2015

(30) Foreign Application Priority Data

Mar. 28, 2014    (EP) .................................... 14162344

(51) Int. Cl.
*B64D 11/06*    (2006.01)

(52) U.S. Cl.
CPC ...... *B64D 11/0601* (2014.12); *B64D 11/0604* (2014.12); *B64D 11/0641* (2014.12)

(58) Field of Classification Search
CPC . B64D 11/06; B64D 11/0601; B64D 11/0604; B64D 11/0641
See application file for complete search history.

(56) References Cited

U.S. PATENT DOCUMENTS

| | | | |
|---|---|---|---|
| 2,382,402 A | 8/1945 | Trimble | |
| 2,583,960 A | 1/1952 | Goodrich | |
| 2,595,607 A | 5/1952 | Paul | |
| 2,947,349 A | 8/1960 | Kryter | |
| 2,963,988 A | 12/1960 | Goodrich | |
| 3,730,583 A | 5/1973 | Colovas et al. | |
| 4,066,227 A | 1/1978 | Buchsel | |
| 4,674,713 A | 6/1987 | Ryan et al. | |
| 5,183,313 A | 2/1993 | Cunningham | |
| 5,540,404 A | 7/1996 | Battenfield | |
| 5,740,989 A | 4/1998 | Daines | |

(Continued)

FOREIGN PATENT DOCUMENTS

| | | |
|---|---|---|
| CA | 2337924 A1 | 8/2001 |
| CA | 2759573 A1 | 6/2012 |

(Continued)

OTHER PUBLICATIONS

European Patent Office, European Search Report for European Patent No. 14162344.7, dated Jun. 3, 2014.

*Primary Examiner* — Richard R Green
(74) *Attorney, Agent, or Firm* — Lorenz & Kopf, LLP

(57) ABSTRACT

A passenger seat arrangement comprises at least one first seat arranged at a first lower level, and at least one second seat arranged at a second elevated level. Each of the first and the second seats comprises a supporting surface for supporting a passenger which is movable between an upright seating position and a reclined lying position. At least one of the first and the second seats is constructed in such a manner that a movement of its supporting surface from the upright seating position into the reclined lying position results in an increase of a distance between the supporting surface of the first seat and the supporting surface of the second seat.

13 Claims, 6 Drawing Sheets

(56) References Cited

U.S. PATENT DOCUMENTS

| | | |
|---|---|---|
| 6,209,956 B1 | 4/2001 | Dryburgh et al. |
| 7,448,575 B2 * | 11/2008 | Cheung .............. B64D 11/0601 244/118.6 |
| 7,469,861 B2 * | 12/2008 | Ferry ................. B64D 11/0601 244/118.6 |
| D649,793 S | 12/2011 | Porter et al. |
| 2002/0033432 A1 | 3/2002 | Mikosza |
| 2003/0029967 A1 | 2/2003 | Mills |
| 2005/0151013 A1 | 7/2005 | Seidel |
| 2005/0189451 A1 | 9/2005 | Mercier |
| 2006/0000947 A1 | 1/2006 | Jacob |
| 2006/0086864 A1 | 4/2006 | Beroth |
| 2006/0192050 A1 | 8/2006 | Cheung et al. |
| 2006/0273222 A1 | 12/2006 | Saint-Jalmes et al. |
| 2007/0246981 A1 | 10/2007 | Plant |
| 2008/0308675 A1 | 12/2008 | Sankrithi et al. |
| 2009/0000342 A1 | 1/2009 | Chen |
| 2009/0066121 A1 | 3/2009 | Jacob |
| 2009/0321565 A1 | 12/2009 | Barmichev et al. |
| 2010/0038485 A1 | 2/2010 | Harcup |
| 2010/0065684 A1 | 3/2010 | Ruiter et al. |
| 2012/0223186 A1 * | 9/2012 | Henshaw ............ B64D 11/0601 244/118.6 |
| 2012/0223557 A1 | 9/2012 | Henshaw |
| 2012/0298798 A1 | 11/2012 | Henshaw et al. |
| 2013/0080357 A1 | 3/2013 | Boren et al. |
| 2014/0014727 A1 | 1/2014 | Choi et al. |
| 2014/0300145 A1 * | 10/2014 | Beroth ............... B64D 11/0641 297/83 |

FOREIGN PATENT DOCUMENTS

| | | |
|---|---|---|
| DE | 102005035752 A1 | 2/2007 |
| DE | 102008016418 | 10/2009 |
| EP | 0126056 A1 | 11/1984 |
| EP | 0606920 A1 | 7/1994 |
| EP | 0693423 A1 | 1/1996 |
| EP | 1211176 A1 | 6/2002 |
| EP | 1364874 A1 | 11/2003 |
| EP | 1568607 A1 | 8/2005 |
| FR | 2576579 A1 | 8/1986 |
| FR | 2842497 A1 | 1/2004 |
| FR | 2842498 A1 | 1/2004 |
| FR | 2843730 A1 | 2/2004 |
| FR | 2866840 A1 | 9/2005 |
| FR | 2924683 A1 | 6/2009 |
| FR | 2928624 A1 | 9/2009 |
| FR | 2943286 A3 | 9/2010 |
| GB | 2433433 A | 6/2007 |
| GB | 2438162 A | 11/2007 |
| GB | 2490095 A | 10/2012 |
| IE | 20010418 A1 | 4/2011 |
| WO | 8200618 A1 | 3/1982 |
| WO | 8502153 A1 | 5/1985 |
| WO | 9510450 A1 | 4/1995 |
| WO | 9707021 A1 | 2/1997 |
| WO | 9835876 A1 | 8/1998 |
| WO | 03053735 A1 | 7/2003 |
| WO | 2006021646 A1 | 3/2006 |
| WO | 2007093321 A1 | 8/2007 |
| WO | 2009073244 A1 | 6/2009 |
| WO | 2009079668 A2 | 6/2009 |
| WO | 201012910 A2 | 2/2010 |
| WO | 2010100500 A2 | 9/2010 |
| WO | 2012050587 A1 | 4/2012 |
| WO | 2012080135 A1 | 6/2012 |
| WO | 2012104182 A1 | 8/2012 |
| WO | 2013063599 A1 | 5/2013 |
| WO | 2013135670 A1 | 9/2013 |
| WO | 2015006313 A2 | 1/2015 |

\* cited by examiner

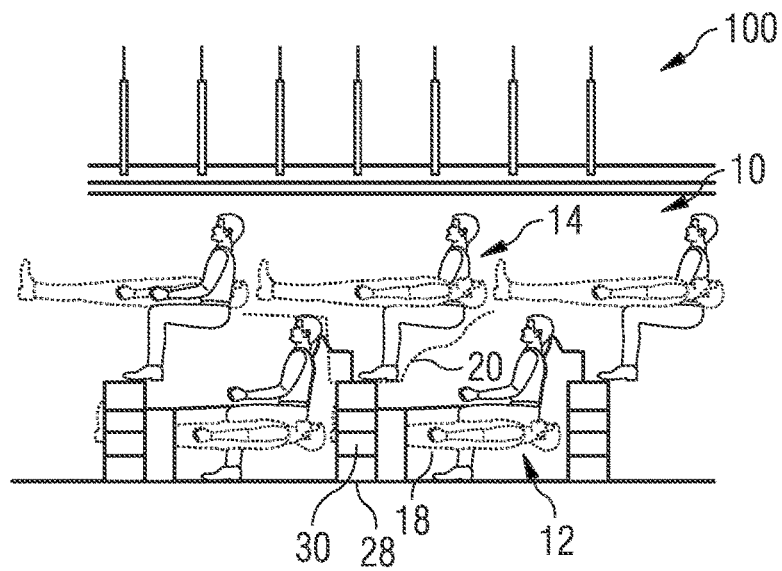
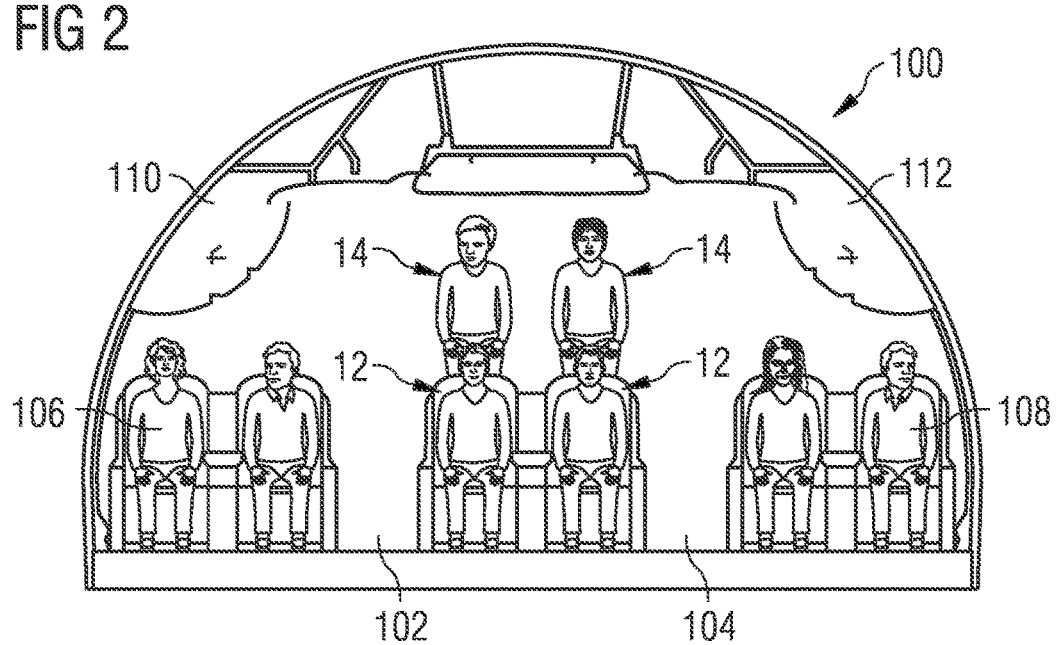

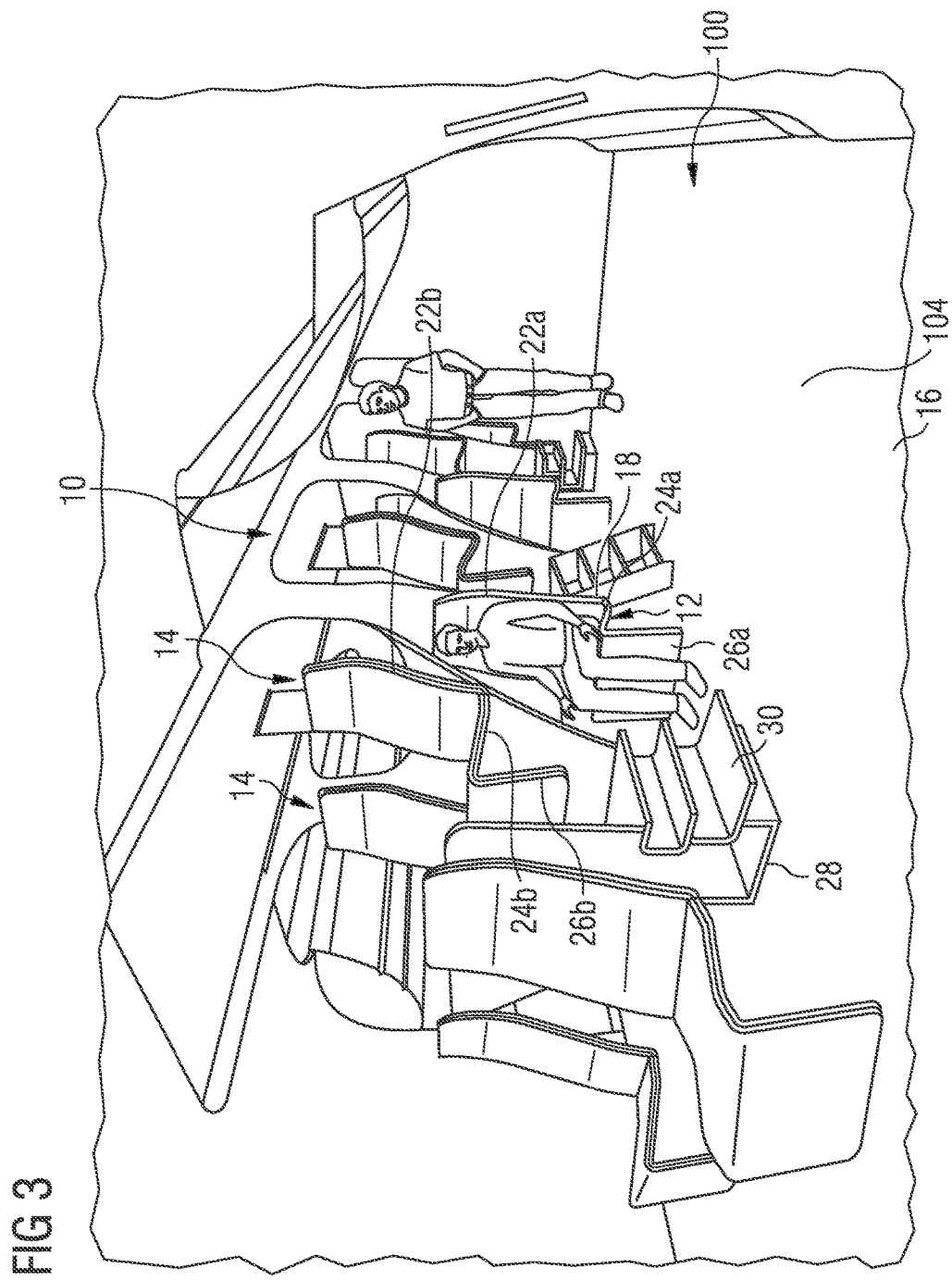

PASSENGER SEAT ARRANGEMENT FOR A VEHICLE

CROSS-REFERENCE TO RELATED APPLICATION

This application claims priority to European Patent Application No. 14 162 344.7 filed Mar. 28, 2014, which is incorporated herein by reference in its entirety.

TECHNICAL FIELD

The embodiments described herein relate to a passenger seat arrangement that is suitable for use in the passenger cabin of an aircraft and in other means of transport, such as, for example, buses or trains.

BACKGROUND

In modern means of transport, in particular in aircraft, it is very important from an economic point of view to make optimum use of the available space in a passenger cabin. Passenger cabins are therefore fitted with as many rows of passenger seats as possible, which are positioned with as little space between them as possible. In order to still more efficiently use the space in a passenger cabin of an aircraft, U.S. Pat. No. 4,066,227 proposes to position an elevated deck structure on a main deck floor in the passenger cabin of a wide-body aircraft for providing a mezzanine seating area in a substantially unused upper lobe of the aircraft fuselage. WO 97/07021 A2 describes a split level seating structure, wherein consecutive rows of seats are alternately arranged at a lower and a higher level.

It would therefore be desirable to provide a passenger seat arrangement that permits optimum use of the space in a passenger cabin of an aircraft or other means of transport, but still provides a high level of comfort for the passengers using the seat arrangement. It would further be desired to provide a passenger cabin region which is equipped with a passenger seat arrangement of this kind.

SUMMARY

A passenger seat arrangement comprises at least one first seat arranged at a first lower level and at least one second seat arranged at a second elevated level. When the passenger seat arrangement is mounted in a passenger cabin of a vehicle, the first lower level at which the first seat is arranged may be defined by a floor of the passenger cabin. The first lower level, however, also may be elevated or lowered relative to the floor of the passenger cabin. Each of the first and the second seats comprises a supporting surface for supporting a passenger. The supporting surface may comprise a backrest portion, a seating portion and a feet supporting portion, and is movable between an upright seating position and a reclined lying position. In the upright seating position, the backrest portion may extend at an angle of approximately 90° relative to the seating portion. To the contrary, in the reclined lying position, the backrest portion may extend at an angle of approximately 130 to 180° relative to the seating portion. In one embodiment of the passenger seat arrangement that provides for a particularly high passenger comfort, at least one of the first and the second seats, in its reclined lying position, is provided with an entirely flat supporting surface with the backrest portion, the seating portion and the feet supporting portion extending at an angle of substantially 180° relative to each other.

At least one of the first and the second seats is constructed in such a manner that a movement of its supporting surface from the upright seating position into the reclined lying position results in an increase of a distance between the supporting surface of the first seat and the supporting surface of the second seat. For example, the first seat may be constructed in such a manner that a movement of its supporting surface from the upright seating position into the reclined lying position results in a lowering of the supporting surface relative to the supporting surface of the second seat thus increasing the distance between the supporting surface of the first seat and the supporting surface of the second seat. Alternatively or additionally thereto, the second seat may be constructed in such a manner that a movement of its supporting surface from the upright seating position into the reclined lying position results in a raising of the supporting surface relative to the supporting surface of the first seat thus also increasing the distance between the supporting surface of the first seat and the supporting surface of the second seat.

In the passenger seat arrangement, the design of the first and/or the second seat thus provides passengers occupying the seats of the passenger seat arrangement enough space to guarantee a high level of comfort independent of whether the seats of the passenger seat arrangement are used in their upright seating position or their reclined lying position. Simultaneously, as compared to usual one level seat arrangements, the passenger seat arrangement allows the installation of a higher number of seats within a given installation space inside a passenger cabin of a vehicle. The passenger seat arrangement thus is in particular suitable for use in, for example, the Business Class area of an aircraft cabin.

In a preferred embodiment of the passenger seat arrangement, the first and the second seats are positioned offset relative to each other along a longitudinal axis of the passenger seat arrangement. This arrangement permits optimum use of the available space in a vehicle passenger cabin and simultaneously optimum comfort for the passengers occupying the seats of the passenger seat arrangement. For example, the first and the second seats can be arranged in such a manner that the first seat, along the longitudinal axis of the passenger seat arrangement, is positioned behind the second seat such that, when both the first and the second seats have their supporting surfaces in the upright seating position, the passenger occupying the first seat has enough head clearance behind the second seat. The head clearance for the passenger occupying the first seat with its supporting surface in the upright seating position may be maintained by constructing the second seat in such a manner that a movement of its supporting surface from the upright seating position into the reclined lying position results in a raising of the supporting surface relative to the supporting surface of the first seat.

The passenger seat arrangement may further comprise an ottoman arranged at the first lower level in front of the first seat. The ottoman then may be used for providing an additional feet supporting portion for the passenger occupying the first seat. Further, the ottoman may be equipped with storage compartments for storing items such as newspapers and the like. A stair or ladder for providing access to the second seat may be mounted to a side surface of the ottoman. The stair or ladder then does not require additional installation space, but may be integrated in the existing ottoman. The use of an ottoman as a support for a stair or ladder for providing access to the second seat is particularly suitable in a passenger seat arrangement, wherein the first and the second seat are positioned offset relative to each other along a longitudinal axis of the passenger seat arrangement.

The supporting surfaces of the first and the second seat, when arranged in their upright seating positions, may face in the same direction. Alternatively, the supporting surfaces of the first and the second seat, when arranged in their upright seating positions, may face in opposite directions. As still a further alternative, the supporting surfaces of the first and the second seat, when arranged in their upright seating positions, may extend at an angle of approximately 90° relative to each other.

The passenger seat arrangement may further comprise at least a third seat arranged at the second elevated level opposed to the second seat. This arrangement has the advantage that a single stair or ladder may be used to provide access to both, the second and the third seat. The third seat preferably also comprises a supporting surface for supporting a passenger which is movable between an upright seating position and reclined lying position. Furthermore, the third seat might be constructed in such a manner that a movement of its supporting surface from the upright seating position into the reclined lying position results in an increase of the distance between the supporting surface of the first seat at the first lower level and the supporting surface of the third seat.

The passenger seat arrangement may comprise two first seats arranged in a row side by side. Additionally or alternatively the passenger seat arrangement may comprise two second seats arranged in a row side by side. Finally, it is also conceivable that the passenger seat arrangement comprises two third seats arranged in a row side by side. In an arrangement comprising two first seats arranged in a row side by side and two second seats arranged in a row side by side, comfortable access to all seats of the arrangements is guaranteed, at least when the passenger seat arrangement is mounted in the passenger cabin of a vehicle in such a manner that access is provided to both first and second arranged in a row side by side, e.g. via two aisles extending along both sides of the passenger seat arrangement. Also, when the arrangement further comprises two third seats arranged in a row side by side, comfortable and unhindered access to all seats is still possible.

Basically, the first seat and/or the second may be arranged in such a manner, that a longitudinal axis thereof extends substantially parallel to a longitudinal axis of the passenger seat arrangement. Preferably, however, the first seat is arranged in such a manner that a longitudinal axis thereof, in a direction of view of a passenger occupying the first seat, defines an acute angle with the longitudinal axis of the passenger seat arrangement. When the seat arrangement is mounted in the passenger cabin of a vehicle, the first seat then may be arranged in such a manner that a feet supporting portion of the supporting surface of the first seat is disposed at a greater distance from an aisle providing access to the first seat than a backrest portion of the supporting surface of the seat. The space between the feet supporting portion of the supporting surface of the first seat and the aisle then may be used for arranging the stair or ladder providing access to the second seat at the second elevated level in a particularly space saving manner.

Alternatively or additionally thereto, the second seat may be arranged in such a manner that a longitudinal axis thereof, in a direction opposite to a direction of view of a passenger occupying the seat, defines an acute angle with the longitudinal axis of the passenger seat arrangement. When the seat arrangement is mounted in the passenger cabin of a vehicle, the second seat then may be arranged in such a manner that a backrest portion of the supporting surface of the second seat is disposed at a greater distance from an aisle providing access to the second seat than a feet supporting portion of the seat. Such an arrangement of the second seat makes optimal use of the available space in the passenger cabin of a vehicle when the first seat is arranged in such a manner that a longitudinal axis thereof, in a direction of view of a passenger occupying the first seat, defines an acute angle with the longitudinal axis of the passenger seat arrangement.

When the seat arrangement comprises two first seats, the two first seats might be arranged in a row side by side at the same position along the longitudinal axis of the seat arrangement and with their longitudinal axes extending substantially parallel to the longitudinal axis of the seat arrangement. However, two first seats arranged in a row side by side preferably are arranged in such a manner that their longitudinal axes, in a direction of view of passengers occupying the first seats, define an acute angle with the longitudinal axis of the passenger seat arrangement in order to allow the stair or ladder providing access to the second seat at the second elevated level to be arranged in a particularly space saving manner. In particular, when the longitudinal axes of the seats are inclined relative to the longitudinal axis of the passenger seat arrangement, a particular space saving positioning of the stair or ladder providing access to the second seat at the second elevated level is possible if the two first seats arranged in a row side by side are positioned offset relative to each other along the longitudinal axis of the passenger seat arrangement. Similarly, also two second seats arranged in a row side by side may be positioned offset relative to each other along the longitudinal axis of the passenger seat arrangement The passenger seat arrangement may further comprise at least one fourth seat arranged at the first lower level in front of the first seat. Like the first seat, the fourth seat may also comprise a supporting surface for supporting a passenger that is movable between an upright seating position and a reclined lying position. Preferably the fourth seat is constructed in such a manner that a movement of its supporting surface from the upright seating position into the reclined lying position results in the supporting surface of the fourth seat being arranged at a different level than the supporting surface of the first seat in its reclined lying position. For example, the fourth seat may be constructed in such a manner that its supporting surface, in its reclined lying position is arranged at a higher level than the supporting surface of the first seat in its reclined lying position, in order to allow a feet supporting portion of the supporting surface of the first seat to be arranged below a backrest portion of the supporting surface of the fourth seat. As a result, a distance between the first and the fourth seat along the longitudinal axis of the passenger seat arrangement may be reduced without affecting the comfort of the passengers occupying the first and the fourth seat.

A passenger cabin region comprises the above described passenger seat arrangements. The passenger cabin region may further comprise a first aisle and a second aisle extending substantially parallel to the first aisle. The passenger seat arrangement may be arranged between the first and the second aisle. The first and the second aisle then provide comfortable access to the seats of the passenger seat arrangement, in particular when the passenger seat arrangement comprises a pair of first seats arranged in a row side by side and/or a pair of second seats arranged in a row side by side. When the passenger cabin region is a region of an aircraft passenger cabin, the passenger cabin region preferably forms a central region of the aircraft passenger cabin. The passenger cabin region then may use the space provided inside of the aircraft passenger cabin and in particular an upper portion of the central region of the aircraft passenger cabin in a particularly effective manner, whereas side regions of the aircraft passenger cabin may be equipped in a conventional manner with one level seat rows and overhead luggage bins.

The passenger cabin region may further comprise a floor panel supporting the first seat. A recess may be formed in the floor panel in such a position that it is suitable to receive the feet of a passenger occupying the first seat. The provision of a recess in the floor panel allows the first seat to be arranged with its supporting surface being placed at a lower position relative to the floor panel, since a passenger occupying the seat may place the feet in the recess when the supporting surface of the seat is in its upright seating position without loss of comfort. When the passenger seat arrangement comprises two or more first seats in a row side by side, plural recesses or an enlarged recess may be formed in the floor panel such that all passengers occupying the row of first seats may place their feet in the recess(es).

In the passenger cabin region, a plurality of carrier elements may be provided for supporting the floor panel. Preferably, a recess is formed between adjacent carrier elements. This ensures that the structural integrity of the floor construction is not affected by the recess provided in the floor panel.

The passenger cabin region may further comprise a ceiling panel. A further recess may be formed in the ceiling panel in such a position that it is suitable to receive the head of a passenger when accessing the second seat. The provision of a further recess in the ceiling panel allows the second seat to be arranged with its supporting surface being placed at a higher position relative to the first seat, since the further recess provides for a sufficient head clearance for a passenger accessing the second seat. When the passenger seat arrangement comprises two or more second seats in a row side by side, plural recesses or an enlarged recess may be formed in the ceiling panel.

In the passenger cabin region a plurality of ribs may be provided for supporting the ceiling panel. Preferably, the further recess is formed between adjacent ribs. This ensures that the structural integrity of the rib structure is not affected by the recess provided in the ceiling panel.

A passenger seat arrangement as described above and/or a passenger cabin region as described above is in particular suitable for use in an aircraft.

BRIEF DESCRIPTION OF THE DRAWINGS

The various embodiments will now be explained in greater detail with reference to the accompanying schematic drawings, in which:

FIG. 1 is a side view of a first embodiment of a passenger seat arrangement installed in a passenger cabin of an aircraft, FIG. 2 is a front view of the passenger seat arrangement according to FIG. 1, FIG. 3 is a three dimensional view of the passenger seat arrangement according to FIG. 1, wherein supporting surfaces of the seats of the passenger seat arrangement are positioned in an upright seating position

DETAILED DESCRIPTION

FIGS. 1 to 4 show a first embodiment of a passenger seat arrangement 10 that is installed in a passenger cabin of an aircraft. The passenger seat arrangement 10 comprises two first seats 12 arranged in a row side by side at a first lower level and two second seats 14 arranged in a row side by side at a second elevated level. The first lower level at which the first seats 12 are arranged is defined by a floor 16 of the passenger cabin, whereas the second elevated level at which the second seats 14 are arranged is arranged above the floor 16 of the passenger cabin.

Figure 4:
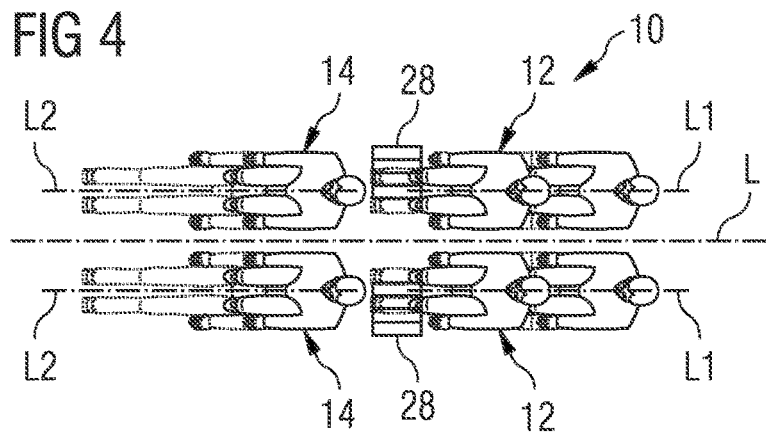
FIG. 4 is a top view of the passenger seat arrangement according to FIG. 1.

Each of the first and the second seats 12, 14 comprises a supporting surface 18, 20 for supporting a passenger. Each supporting surface 12, 14 comprises a backrest portion 22a, 22b, a seating portion 24a, 24b and a feet supporting portion 26a, 26b and is movable between an upright seating position, see in particular FIG. 3, and a reclined lying position. In the upright seating position, the backrest portion 22a, 22b extends at an angle of approximately 90° relative to the seating portion 24a, 24b. To the contrary, in the reclined lying position, the backrest portion 22a, 22b and the feet supporting portion 26a, 26b extend at an angle of approximately 180° relative to the seating portion 24a, 24b. In FIG. 1, the position of passengers occupying the first and the second seats 12, 14 with the supporting surfaces 18, 20 of the seats 12, 14 being placed in the upright seating position is indicated in continuous lines, whereas the position of passengers occupying the first and the second seats 12, 14 with the supporting surfaces 18, 20 of the seats 12, 14 being placed in the reclines lying position is indicated in dotted lines. FIG. 4 is the supporting surfaces 18, 20 of the first and the second seats 12, 14 in the upright seating position.

As becomes apparent in particular from FIG. 1, each of the first and the second seats 12, 14 is constructed in such a manner that a movement of its supporting surface 18, 20 from the upright seating position into the reclined lying position results in an increase of a distance between the supporting surface 18 of a first seat 12 and the supporting surface 20 of a second seat 14 arranged above the first seat 12. In particular, each first seat 12 is constructed in such a manner that a movement of its supporting surface 18 from the upright seating position into the reclined lying position results in a lowering of the supporting surface 18 relative to the supporting surface 20 of the second seat 14 arranged above the first seat 12 thus increasing the distance between the supporting surface 18 of the first seat 12 and the supporting surface 20 of the second seat 14. Furthermore, each second seat 14 is constructed in such a manner that a movement of its supporting surface 20 from the upright seating position into the reclined lying position results in a raising of the supporting surface 20 relative to the supporting surface 18 of a first seat 12 arranged below the second seat 14 thus further increasing the distance between the supporting surface 18 of the first seat 12 and the supporting surface 20 of the second seat 14. The passenger seat arrangement 10 thus provides passengers occupying the seats 12, 14 a high level of comfort independent of whether the seats 12, 14 are used in their upright seating position or their reclined lying position.

As becomes apparent from FIGS. 3 and 4, in the passenger seat arrangement 10 according to FIGS. 1 to 4, the first and the second seats 12, 14 are arranged in such a manner, that a longitudinal axis L1, L2 thereof extends substantially parallel to a longitudinal axis L of the passenger seat arrangement 10. Furthermore, the two first seats 12 and the two second seats 14 are arranged in a row side by side at the same position along the longitudinal axis L of the passenger seat arrangement 10. The supporting surfaces 18, 20 of the first and the second seats 12, 14, when arranged in their upright seating positions, face in the same direction.

The row of first seats 12 and the row of second seats 14, however, are positioned offset relative to each other along the longitudinal axis L of the passenger seat arrangement 10. In particular, the row of first seats 12 and the row of second seats 14 are be arranged in such a manner that the first seats, along the longitudinal axis L of the passenger seat arrangement 10, are positioned behind the second seats 14 such that, when both the first and the second seats 12, 14 have their supporting surfaces 18, 20 in the upright seating position, the passengers occupying the first seats have enough head clearance behind the second seats 14.

The head clearance for the passengers occupying the first seats 12 with their supporting surfaces 18 in the upright seating position is maintained, even in case the seconds seats 14 are used with their supporting surfaces 20 in the reclines lying position, since the second seats 14 are constructed in such a manner that a movement of their supporting surfaces 20 from the upright seating position into the reclined lying position results in a raising of the supporting surfaces 20 relative to the supporting surfaces 18 of the first seats 12. If the first seats 12 of the passenger seat arrangement 10 are used with their supporting surfaces 18 in the reclined lying position, the lowering of the supporting surfaces 18 of the first seats 12 relative to the supporting surfaces 20 of the second seats 14 provides the passengers occupying the first seats 12 with additional head clearance independent of the state of operation of the second seats 14.

The passenger seat arrangement 10 further comprises an ottoman 28 arranged at the first lower level in front of each first seat 12. The ottoman 28 provides for an additional feet supporting portion for the passengers occupying the first seats 12 and is equipped with storage compartments for storing items such as newspapers and the like. A stair 30 for providing access to the second seat is mounted to a side surface of the ottoman 28.

As shown in FIGS. 2 and 3, the passenger seat arrangement 10 is installed in a passenger cabin region 100 between a first and a second aisle 102, 104, the first and the second aisle 102, 104 extending substantially parallel to the each other. The first and the second aisle 102, 104 provide comfortable access to each one of the seats 12, 14 of the passenger seat arrangement 10. The passenger cabin region 100 forms a central region of the aircraft passenger cabin. Thus, the passenger seat arrangement 10 is installed in the central region of the aircraft passenger cabin making optimal use of the height of the aircraft passenger cabin in the central region thereof. To the contrary, side regions of the aircraft passenger cabin may be equipped in a conventional manner with one level of seat rows 106, 108 and overhead luggage bins 110, 112.

Figure 5:
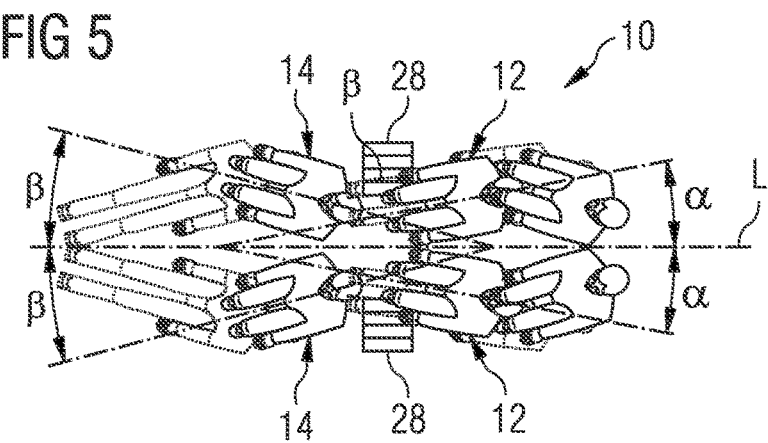
FIG. 5 is an alternative possibility for arranging the seats in the passenger seat arrangement according to FIG. 1.
Figure 6:
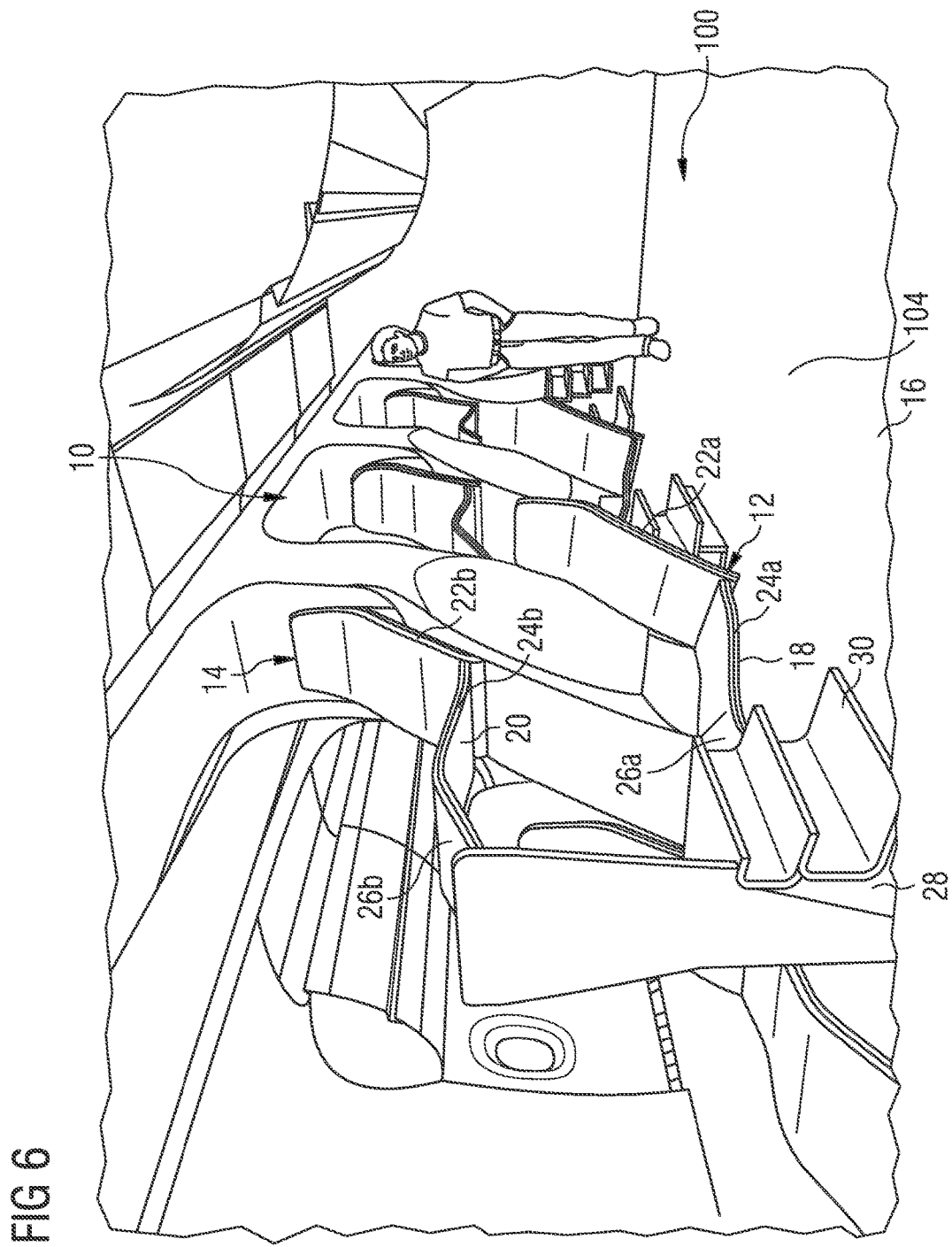
FIG. 6 is a three dimensional view of the passenger seat arrangement according to FIG. 5, wherein supporting surfaces of the seats of the passenger seat arrangement are positioned in a partially reclined position.

The passenger seat arrangement 10 depicted in FIGS. 5 and 6 differs from the arrangement 10 according to FIGS. 1 to 4 in that the first seats 12 are arranged in such a manner that their longitudinal axes L1, in a direction of view of a passenger occupying the first seats 12, define an acute angle $\alpha$ with the longitudinal axis L of the passenger seat arrangement 10. Specifically, each first seat 12 is arranged in such a manner that the feet supporting portion 26a of its supporting surface 18 is disposed at a greater distance from the aisle 102, 104 providing access to the first seat 12 than the backrest portion 22a of its supporting surface 18. The space between the feet supporting portion 26a of the supporting surface 18 of the first seats 12 and the aisles 102, 104 then may be used for arranging the stair 30 providing access to the second seats 14 at the second elevated level.

Furthermore, the second seats 14 are arranged in such a manner that their longitudinal axes L2, in a direction opposite to a direction of view of a passenger occupying the seats 14, defines an acute angle $\beta$ with the longitudinal axis L of the passenger seat arrangement 10. Specifically, each second seat 14 is arranged in such a manner that the backrest portion 22b of its supporting surface 20 is disposed at a greater distance from the aisle 102, 104 providing access to the second seat 14 than the feet supporting portion 26b of its supporting surface 20. Otherwise the structure and the function of the passenger seat arrangement 10 depicted in FIG. 5 correspond to the structure and the function of the arrangement 10 according to FIGS. 1 to 4.

Figure 7:
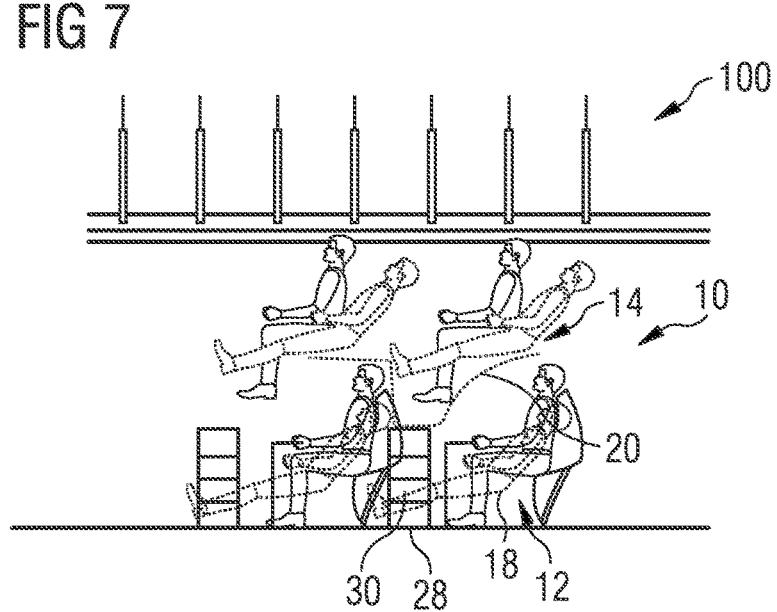
FIG. 7 is a side view of a further embodiment of a passenger seat arrangement installed in a passenger cabin of an aircraft.

The passenger seat arrangement 10 depicted in FIG. 7 differs from the arrangement 10 shown in FIGS. 1 to 4 in that the first and the second seats 12, 14 are provided with a supporting surface 18, 20, which, in the reclined lying position does not form a flat surface. Instead, when the supporting surfaces 18, 20 of the first and the second seats 12, 14 are arranged in the reclined lying position, the backrest portion 22a, 22b extends at an angle of approximately 140° relative to the seating portion 24a, 24b and the feet supporting portion 26a, 26b. Furthermore, in the passenger seat arrangement of FIG. 7, only the first seats 12 are constructed in such a manner that a movement of their supporting surface 18 from the upright seating position into the reclined lying position results in a lowering of the supporting surface 18 relative to the supporting surface 20 of the second seats 14 arranged above the first seats 12 thus increasing the distance between the supporting surface 18 of the first seats 12 and the supporting surface 20 of the second seats 14.

To the contrary, the supporting surface 20 of the second seats 20 is maintained at a constant level independent of whether the supporting surface 20 is positioned in the upright seating position or the reclined lying position. Otherwise the structure and the function of the passenger seat arrangement 10 depicted in FIG. 7 correspond to the structure and the function of the arrangement 10 according to FIGS. 1 to 4.

Figure 8:
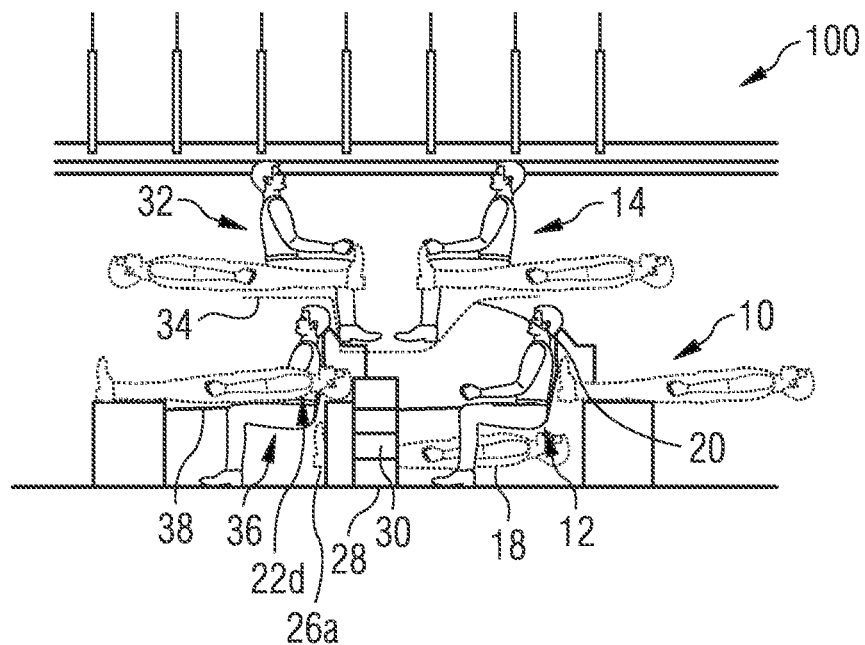
FIG. 8 is a side view of a further embodiment of a passenger seat arrangement installed in a passenger cabin of an aircraft.

The passenger seat arrangement 10 depicted in FIG. 8 differs from the arrangement 10 according to FIG. 7 in that the passenger seat arrangement 10 further comprises two third seats 32 arranged in a row side by side at the second elevated level, wherein each third seat 32 is arranged opposed to a second seat 14. This arrangement has the advantage that a single stair 30 may be used to provide access to a second and a third seat 14, 32. Like the second seat 14, also the third seat 32 comprises a supporting surface 34 for supporting a passenger which is movable between an upright seating position and reclined lying position. Different from the arrangement 10 depicted in FIG. 7, in the passenger seat arrangement 10 of FIG. 8, the supporting surfaces 18, 20, 32 of the first, the second and the third seats 12, 14, 20, in their reclined lying position again form flat surfaces.

Furthermore, the passenger seat arrangement depicted in FIG. 8 further comprises two fourth seats 36 arranged in a row side by side at the first lower level in front of the first seats 12. Like the first seats 12, also the fourth seats 36 each comprise a supporting surface 38 for supporting a passenger which is movable between an upright seating position and a reclined lying position. In its reclined lying position, the supporting surface 38 of the each fourth seat 36 forms a flat surface. Each fourth seat 36 is constructed in such a manner that a movement of its supporting surface 38 from the upright seating position into the reclined lying position results in the supporting surface 38 of the fourth seat 36 being arranged at a different level than the supporting surface 20 of the first seat 12 in its reclined lying position. In particular, the fourth seats 36 are constructed in such a manner that their supporting surface 38, in its reclined lying position is arranged at a higher level than the supporting surface 20 of the first seats 12 in its reclined lying position in order to allow a feet supporting portion 26a of the supporting surface 20 of a first seat 12 to extend below a backrest portion 22d of the supporting surface 38 of a fourth seat 36 arranged in front of the first seat 12. Otherwise the structure and the function of the passenger seat arrangement 10 depicted in FIG. 8 correspond to the structure and the function of the arrangement 10 according to FIG. 7.

Figure 9:
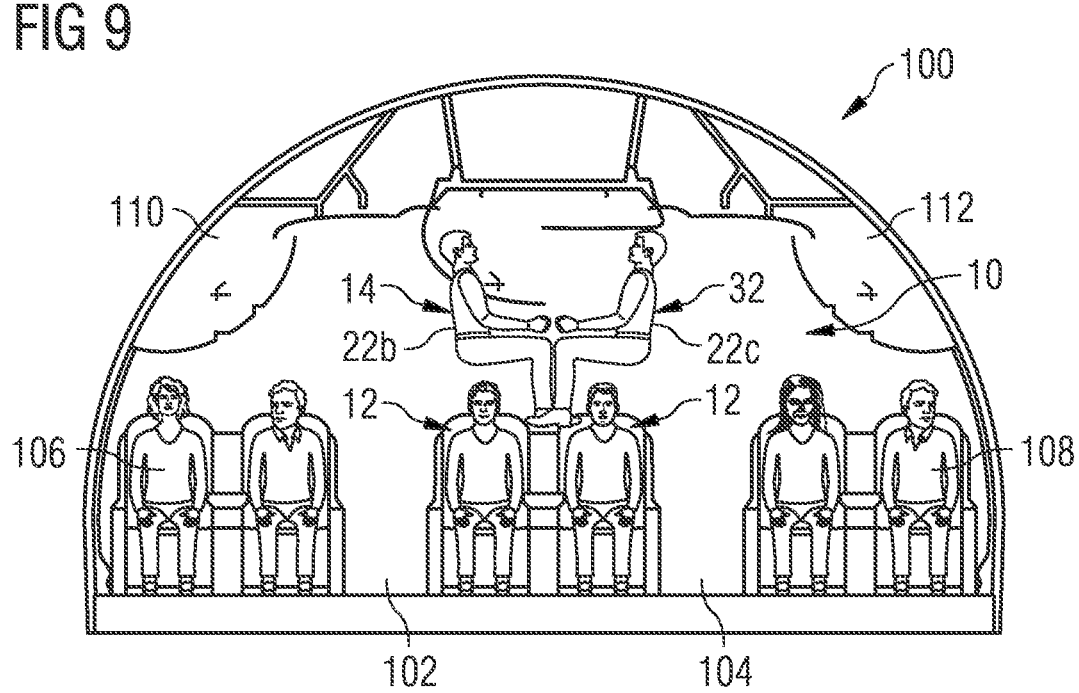
FIG. 9 is a front view of a further embodiment of a passenger seat arrangement installed in a passenger cabin of an aircraft.

The passenger seat arrangement 10 depicted in FIG. 9 differs from the arrangement 10 according to FIG. 8 in that the supporting surfaces 18, 20 of the first and the second seats 12, 14, when arranged in their upright seating positions, extend at an angle of approximately 90° relative to each other. The backrest portion 22b of the supporting surface 20 of the second seats 14 thus faces the aisle 102. Similarly, also the supporting surfaces 18, 38 of the first and the third seats 12, 36, when arranged in their upright seating positions, extend at an angle of approximately 90° relative to each other. The backrest portion 22c of the supporting surface 38 of the third seats 36 thus faces the aisle 104. Otherwise the structure and the function of the passenger seat arrangement 10 depicted in FIG. 9 correspond to the structure and the function of the arrangement 10 according to FIG. 8.

Figure 10:
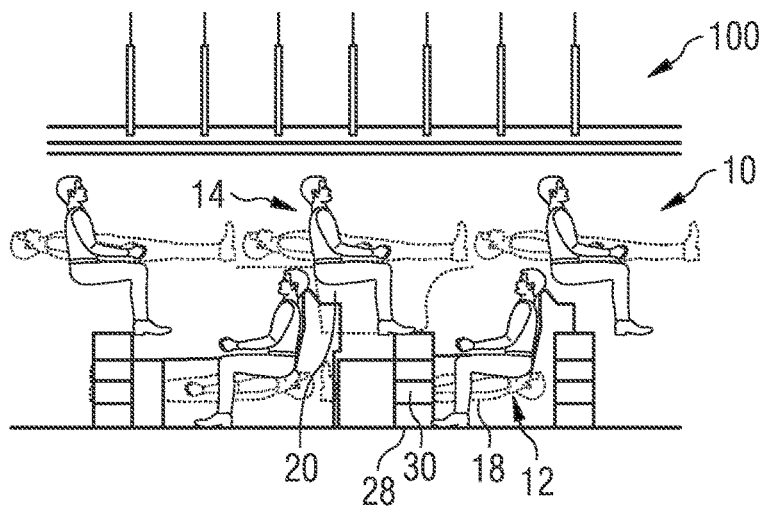
FIG. 10 is a side view of a further embodiment of a passenger seat arrangement installed in a passenger cabin of an aircraft.

The passenger seat arrangement 10 depicted in FIG. 10 differs from the arrangement 10 according to FIGS. 1 to 4 in that the supporting surfaces 18, 20 of the first and the second seats 12, 14, when arranged in their upright seating positions, face in opposite directions. Otherwise the structure and the function of the passenger seat arrangement 10 depicted in FIG. 10 correspond to the structure and the function of the arrangement 10 according to FIGS. 1 to 4.

Figure 11:
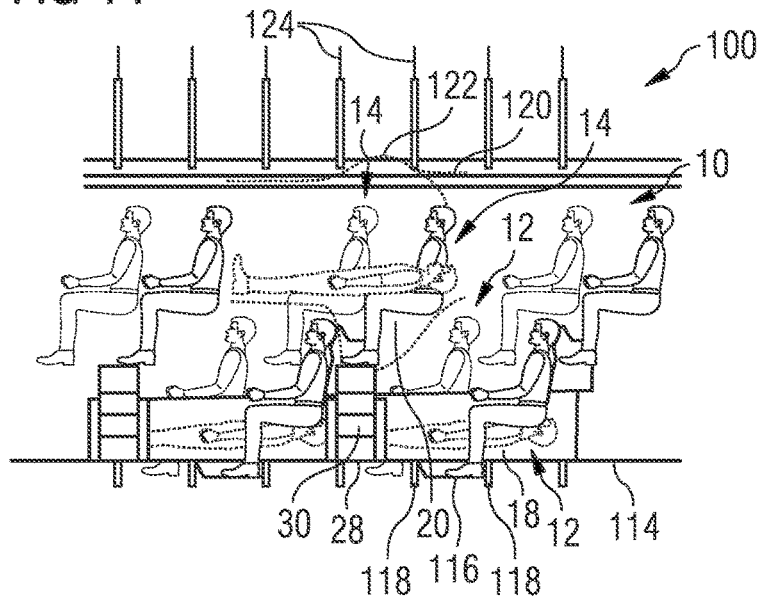
FIG. 11 is a side view of a further embodiment of a passenger seat arrangement installed in a passenger cabin of an aircraft.
Figure 12:
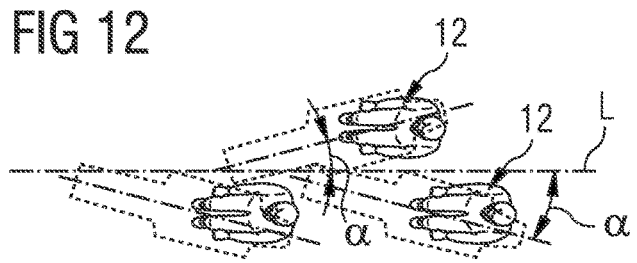
FIG. 12 is a top view of the passenger seat arrangement according to FIG. 11.

The passenger seat arrangement 10 depicted in FIGS. 11 and 12 differs from the arrangement 10 according to FIGS. 1 to 4 in that the two first seats 12 arranged in a row side by side are positioned offset relative to each other along the longitudinal axis L of the passenger seat arrangement 10. Similarly, also the two second seats 14 arranged in a row side by side are positioned offset relative to each other along the longitudinal axis L of the passenger seat arrangement 10.

The passenger cabin region 100 accommodating the passenger seat arrangement 10 further comprises a floor panel 114 supporting the first seats 12. A recess 116 is formed in the floor panel 114 in such a position that it is suitable to receive the feet of the passengers occupying the first seats 12. The provision of the recess 116 in the floor panel 114 allows the first seats 12 to be arranged with their supporting surface 18 being placed at a lower position relative to the floor panel 114, since the passengers occupying the seats 12 may place their feet in the recess 116 when the supporting surface 18 of the seats 12 is in its upright seating position without loss of comfort. A plurality of carrier elements 118 is provided for supporting the floor panel 114. The recess 116 is formed between adjacent carrier elements 118 thus ensuring that the structural integrity of the floor construction is not affected by the recess 116.

The passenger cabin region further comprises a ceiling panel 120. A further recess 122 is formed in the ceiling panel 120 in such a position that it is suitable to receive the head of a passenger when accessing the second seats 14. The provision of the further recess 122 in the ceiling panel 120 allows the second seats 14 to be arranged with their supporting surface 20 being placed at a higher position relative to the first seats 12, since the further recess 122 provides for a sufficient head clearance for a passenger accessing the second seats 14. A plurality of ribs 124 is provided for supporting the ceiling panel 120. The ribs 124 form a part of the aircraft's primary structure. The further recess 122 is formed between adjacent ribs 124 thus ensuring that the structural integrity of the primary aircraft structure is not affected by the further recess 122. Otherwise the structure and the function of the passenger seat arrangement 10 depicted in FIGS. 11 and 12 correspond to the structure and the function of the arrangement 10 according to FIGS. 1 to 4.

Although specific features of the passenger seat arrangement 10 have been described with reference to specific embodiments of the passenger seat arrangement 10, these features can be combined as needed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A passenger seat arrangement, comprising:
   at least one first seat arranged at a first lower level,
   at least one second seat arranged at a second elevated level,
   wherein each of the first and the second seats comprises a supporting surface for supporting a passenger that is movable between an upright seating position and a reclined lying position, and wherein at least one of the first and the second seats is constructed in such a manner that a movement of its supporting surface from the upright seating position into the reclined lying position results in an increase in a distance between the supporting surface of the first seat and the supporting surface of the second seat, and further comprising at least one further seat arranged at the first lower level in front of the first seat, wherein the further seat comprises a supporting surface for supporting a passenger which is movable between an upright seating position and a reclined lying position, and wherein the further seat is constructed in such a manner that a movement of its supporting surface from the upright seating position into the reclined lying position results in the supporting surface of the further seat being arranged at a different level than the supporting surface of the first seat in its reclined lying position.

2. The passenger seat arrangement according to claim 1, wherein the first and the second seats are positioned offset relative to each other along a longitudinal axis of the passenger seat arrangement.

3. The passenger seat arrangement according to claim 1, further comprising an ottoman arranged at the first lower level in front of the first seat, wherein a stair or ladder for providing access to the second seat is mounted to a side surface of the ottoman.

4. The passenger seat arrangement according to claim 1, wherein the supporting surfaces of the first and the second seat, when arranged in their upright seating positions, face in the same direction or in opposite directions or wherein the supporting surfaces of the first and the second seats, when arranged in their upright seating positions, extend at an angle of approximately 90° relative to each other.

5. The passenger seat arrangement according to claim 1, further comprising at least a third seat arranged at the second elevated level opposed to the second seat.

6. The passenger seat arrangement according to claim 1, comprising at least one of:
two first seats arranged in a row side by side,
two second seats arranged in a row side by side, and
two third seats arranged in a row side by side.

7. The passenger seat arrangement according to claim 6, wherein at least one of two first seats arranged in a row side by side and two second seats arranged in a row side by side are positioned offset relative to each other along the longitudinal axis of the passenger seat arrangement.

8. The passenger seat arrangement according to claim 1, wherein the first seat is arranged in such a manner that a longitudinal axis thereof, in a direction of view of a passenger occupying the first seat, defines an acute angle with the longitudinal axis of the passenger seat arrangement, and/or wherein the second seat is arranged in such a manner that a longitudinal axis thereof, in a direction opposite to a direction of view of a passenger occupying the second seat, defines an acute angle with the longitudinal axis of the passenger seat arrangement.

9. A passenger cabin region comprising a passenger seat arrangement that comprises:
at least one first seat arranged at a first lower level;
at least one second seat arranged at a second elevated level; and
a ceiling panel, wherein a further recess is formed in the ceiling panel in such a position that it is suitable to receive the head of a passenger when accessing the second seat;
wherein each of the first and the second seats comprises a supporting surface for supporting a passenger that is movable between an upright seating position and a reclined lying position, and wherein at least one of the first and the second seats is constructed in such a manner that a movement of its supporting surface from the upright seating position into the reclined lying position results in an increase in a distance between the supporting surface of the first seat and the supporting surface of the second seat.

10. The passenger cabin region according to claim 9, further comprising:
a first aisle, and
a second aisle extending substantially parallel to the first aisle, wherein the passenger seat arrangement is arranged between the first and the second aisle.

11. The passenger cabin region according to claim 9, further comprising:
a floor panel supporting the first seat, wherein a recess is formed in the floor panel in such a position that it is suitable to receive the feet of a passenger occupying the first seat.

12. The passenger cabin region according to claim 11, further comprising:
a plurality of carrier elements supporting the floor panel, wherein the recess is formed between adjacent carrier elements.

13. The passenger cabin region according to claim 9, further comprising:
a plurality of ribs supporting the ceiling panel, wherein the further recess is formed between adjacent ribs.

* * * * *